United States Patent [19]

Stader et al.

[11] Patent Number: 4,896,351
[45] Date of Patent: Jan. 23, 1990

[54] APPARATUS FOR SEPARATING DC CURRENT AND AC CURRENT COMPONENTS OF A COMPOSITE SIGNAL

[75] Inventors: Harald Stader; Hans W. Rudolf, both of Munich, Fed. Rep. of Germany

[73] Assignee: Siemens AG, Berlin and Munich, Fed. Rep. of Germany

[21] Appl. No.: 61,379

[22] Filed: Jun. 15, 1987

Related U.S. Application Data

[63] Continuation-in-part of Ser. No. 872,063, Jun. 9, 1986, abandoned.

[30] Foreign Application Priority Data

Jun. 27, 1985 [DE] Fed. Rep. of Germany ....... 3623045
Jul. 31, 1986 [DE] Fed. Rep. of Germany ....... 3625872

[51] Int. Cl.$^4$ .................... H03H 11/04; H03G 11/02
[52] U.S. Cl. .................................. 379/399; 330/110; 333/172
[58] Field of Search ............... 330/260, 110, 259, 293, 330/296; 333/172; 379/405, 400, 398, 399, 413, 412, 387, 324

[56] References Cited

U.S. PATENT DOCUMENTS

| | | | |
|---|---|---|---|
| 3,803,423 | 4/1974 | Libby | 333/172 X |
| 4,074,087 | 2/1978 | Blake, Jr. et al. | |
| 4,078,205 | 3/1978 | Van Schoiack | 330/107 |
| 4,119,922 | 10/1978 | Schröder | 330/86 |
| 4,342,006 | 7/1982 | Ishigahi | 330/259 |
| 4,398,143 | 8/1983 | Bonis | 323/370 |
| 4,456,985 | 6/1984 | Carsten et al. | 370/30 |
| 4,462,105 | 7/1984 | Wagner | 375/8 |
| 4,498,063 | 2/1985 | Makabe et al. | 333/172 |
| 4,598,173 | 7/1986 | Chea, Jr. et al. | 379/413 X |
| 4,608,686 | 8/1986 | Barsellotti | 379/94 X |
| 4,709,228 | 11/1987 | Hückling et al. | 340/365 S |

FOREIGN PATENT DOCUMENTS

| | | | |
|---|---|---|---|
| 60-32496 | 2/1985 | Japan . | |
| 0239111 | 11/1985 | Japan | 330/110 |
| 8000350 | 8/1981 | Netherlands | 330/110 |

OTHER PUBLICATIONS

"Linear and Interface Circuits Applications"; Pippenger et al., Texas Instruments, vol. 1, 1985, pp. 2–11 to 3–10.
D. Lancaster, "Understanding Active Filters", Dec. 1976, pp. 69–73.
S. C. Roy et al., "Second Order Active RC Filters Using a Single Operational Amplifier", Nov. 1971, pp. 408–412.
A. Budak, "Passive and Active Network Analysis and Synthesis", 1974, pp. 404–405, 430–433.

Primary Examiner—Jin F. Ng
Assistant Examiner—Randall S. Vaas
Attorney, Agent, or Firm—David N. Caracappa

[57] ABSTRACT

An apparatus for separating dc current and ac current signal portions of a composite signal. The apparatus has a main current path for carrying the composite signal. This path splits into a dc current path and into two dc blocked ac current paths. At the node a virtual ground potential for the ac current signal portions is generated with the aid of an inverting amplifier with negative feedback located in one of the ac current paths. Thus, only the dc current portions flow over the dc current path. In a preferred embodiment, the dc blocking is implemented by a capacitor in each ac current path, and the inverting amplifier is an operational amplifier, whose non-inverting input is at ground potential, whose inverting input is connected with the respective capacitor and whose output is connected both with the inverting input via an ohmic negative feedback resistor and with an impedance in the other ac current path.

1 Claim, 1 Drawing Sheet

4,896,351

APPARATUS FOR SEPARATING DC CURRENT AND AC CURRENT COMPONENTS OF A COMPOSITE SIGNAL

CROSS-REFERENCE TO RELATED APPLICATION

This application is a continuation-in-part of commonly owned pending application Ser. No. 872,063, filed Jun. 9, 1986 now abandoned. The entire disclosure of this patent application (including the drawings) is hereby incorporated herein as if fully set forth.

BACKGROUND OF THE INVENTION

The invention relates to an apparatus for separating dc current and ac current components of a composite signal. It relates in particular to a circuit arrangement for separating dc and ac current components of a composite signal in a subscriber line station.

The necessity of separating signals arises in general in measurement circuits.

In this connection, a special application example outside this range should be mentioned, namely the conditions of modern subscriber line circuits for connecting subscriber lines to digital time division multiplexing telephone systems.

For handling a composite signal which occurs in subscriber lines in the form of a loop current superposed by voice signals, subscriber line circuits usually have to derive loop status indications from the dc current portion of the loop current and to simulate the correct ac current impedance for an optimal signal matching of the voice signal to be transmitted.

In the interest of an optimal integration capacity, modern subscriber line circuits are subdivided into different hardware modules, of which a high voltage power module and a low voltage module are configured as integrated circuits, while a safety element module and a test module are assembled with discrete components.

While such tasks as call recognition, voice transmission, the establishing of line symmetry, subscriber line drive and the separation of longitudinal current components are performed by the high voltage power module, the low voltage module is used for feeding charge pulses, for realizing different monitoring functions, for setting the two wire impedance, and for detecting the loop status.

When using this type of configuration a sum signal forwarded by the power module and comprising dc and ac components must be separated into its constituents to obtain control variables with which the requested supply characteristics in form of a respective dc current resistance and a requested impedance can be set.

In principle, this kind of signal separation can be obtained with the use of RC combinations. However, in the frequency range of the voice band (300 Hz to 3400 Hz), which is of interest here, capacitance values of approximately 100 $\mu$uF are required. Moreover, the dc current signals occur with dc components of either polarity, so that nonpolar capacitors must be used. These requirements are met only by foil capacitors, which are both bulky and expensive.

It is therefore an object of the invention to provide an apparatus which separates as completely as possible the dc and ac current components of a composite signal.

It is another object of the invention to provide an apparatus for separating the dc and ac current components of a composite signal in a compact and cost-effective manner.

Yet another object of the invention is to provide an apparatus for separating the dc and ac current components of a composite signal in the voice band.

A further object of the invention is to provide an apparatus which separates the dc and ac current components of a composite signal such that even ac current components of high amplitudes are not distorted.

Yet a further object is, in general, to improve on known apparatus of this type.

SUMMARY OF THE INVENTION

Broadly, the invention is directed to an apparatus for separating dc current and ac current components of a composite signal. The apparatus comprises a main current path having a node where it branches out into a first and second circuit. The former has a resistor for receiving the dc current component. The later includes an impedance for tapping the ac current component, dc blocking means and self-compensating means. The dc blocking means prevent dc current components from reaching the impedance, and the self-compensating means offset voltage drops in other parts of the ac circuit such that—at least in a frequency range of interest—the node is kept at ground potential for the ac current components.

According to one embodiment of the invention the first circuit includes a first current path having the resistor path, and the second circuit includes a second and a third current path. The dc blocking means comprise a dc blocking filter in each current path, for preventing dc current components from entering the path. The third path includes—behind its dc blocking filter—an inverting amplifier. The output signal of this amplifier is superposed on the voltage drop in the second path and is set in such a manner that it compensates for the voltage drop in at least the frequency range of interest, so that in this range the node acts as a virtual ground for the ac current components.

In accordance with a more specific aspect of the invention, the dc blocking filters are capacitors and the inverting amplifier is an operational amplifier, whose non-inverting input is tied to ground potential, whose inverting input is connected with the respective capacitor and whose output is connected with the inverting input via an ohmic negative feedback resistor and, in addition, with the impedance of the second path. The capacitors which are implemented in this case may have a considerably reduced capacitance, e.g. less than 10 $\mu$f for composite signals having ac components in the voice band.

If the inverting amplifier is an operational amplifier having an ohmic negative feedback resistor, this resistor is preferably shunted by two oppositively poled diodes. These diodes have threshold values which will limit ac voltage constituents having amplitudes which would overdrive the operational amplifier.

The foregoing and other objects, features and advantages of the invention will be apparent from the following detailed description of preferred embodiments of the invention, as illustrated in the accompanying drawing.

DETAILED DESCRIPTION OF THE PREFERRED EMBODIMENT

Figure 1:
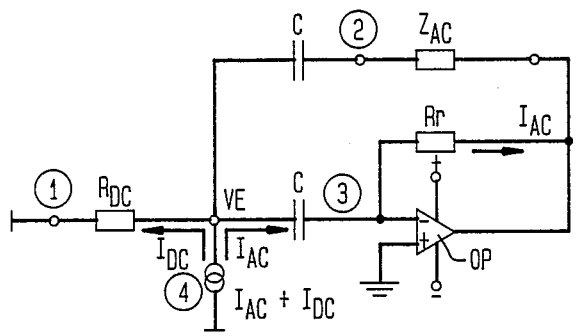
FIG. 1 is a schematic circuit diagram of a first embodiment of this invention.

In FIG. 1, it is assumed that the signal source which supplies a composite signal $I_{DC}+I_{AC}$ consisting of ac and dc current portions, is a constant current source which lies in a main current path 4. This current path branches at a node VE into a first, second and third current path 1, 2, and 3, respectively. Current path 1 includes an ohmic resistor $R_{DC}$, where the dc voltage portions of the composite signal are to be tapped. Current path 2 includes a capacitor C as well as an impedance $Z_{AC}$, where the ac voltage portions of the composite signal are to be tapped, for example via an operational amplifier (not shown).

The third current path 3 also includes a capacitor C, which can be of the same capacitance as the capacitor located in the second current path 2, as well as an operational amplifier OP whose non-inverting input (+) is tied to ground potential and whose inverting input (−) is connected with the connection of capacitor C which faces away from the node VE. The output of the operational amplifier OP is connected with the inverting input via a negative feedback resistor Rr.

In addition, the output of the operational amplifier OP is also connected with the connection of impedance $Z_{AC}$ which faces away from capacitor C of the second current path 2.

By setting the gain of the operational amplifier OP accordingly, the voltage drop across the switching elements of the second current path 2, i.e. capacitor C and impedance $Z_{AC}$, is compensated for by the voltage at the output of operational amplifier OP. Since only ac currents $I_{AC}$ can flow across the second and the third current path 2 and 3, respectively, a virtual ground potential is created for ac current signals at node VE. This means that, as desired, only the dc current components $I_{DC}$ flow via resistor $R_{DC}$ through the first current path 1.

With a circuit arrangement for the voice band between 300 Hz and 3440 Hz, which acts like a band pass filter with a pass band that lies, however, far below the voice band, capacitors C in both current paths 2 and 3 have only a capacitance of 1 μuF each, and the attenuation of the ac current portions in the dc current path is larger than 60 dB.

Typically, the circuit of FIG. 1 is used in electronic subscriber interconnect circuits for the connection of subscriber lines to digital time multiplex telephone switching systems. In such an application, ac signals lying outside of the voice band also appear on the current path conducting the combined signals. These signals, which may be stronger than the signals in the voice band by an order of magnitude, can be of great enough amplitude to drive the operational amplifier beyond its dynamic range and are then distorted. The most significant of these ac signals are the dial pulses which are produced by the periodic opening and closing of the battery current circuit, and thus appear with amplitudes as high as 60 volts.

Figure 2:
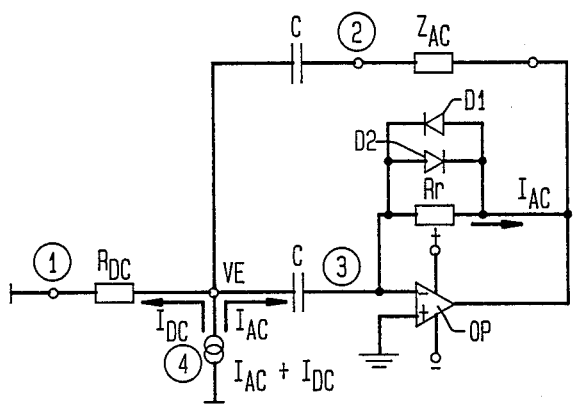
FIG. 2 shows a schematic circuit diagram of a second embodiment of the invention.

To avoid such a signal distortion, oppositively poled diodes D1 and D2 are placed in parallel with the feedback resistance Rr (FIG. 2). The thresholds of diodes D1 and D2 are so selected that ac voltages constituents with amplitudes that would lead to overdriving the operational amplifier OP, thus especially the dial pulses already noted, are limited.

Having thus described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

We claim:

1. An apparatus for separating dc current and ac current components of a composite signal, comprising:
   (a) a main current path for carrying the composite signal, said current path having a node where it branches out into:
   (b) a first current path including a resistor for receiving the dc current components;
   (c) a second current path including an impedance for tapping the ac current components and a first dc blocking filter for preventing the dc current components from flowing through the impedance;
   (d) a third current path, coupled in parallel with the second current path, which includes an inverting amplifier formed by an operational amplifier, and an ohmic negative feedback resistor, wherein
      (d1) the output of the operational amplifier is connected with its inverting input via the ohmic negative feedback resistor;
      (d2) the output signal of the operational amplifier is superposed on the voltage drop in the second current path and is set in such a manner that it compensates for the voltage drop in at least a specific frequency range of interest, so that the node acts as a virtual ground for the ac current components in said frequency range; and
      (d3) the negative feedback resistor is shunted by two oppositely poled diodes having threshold values selected to prevent overdriving of the operational amplifier.

* * * * *

UNITED STATES PATENT AND TRADEMARK OFFICE
CERTIFICATE OF CORRECTION

PATENT NO. : 4,896,351
DATED : Jan. 23, 1990
INVENTOR(S) : Stader et al.

It is certified that error appears in the above-identified patent and that said Letters Patent is hereby corrected as shown below:

Cover Page
Section [30] delete "3623045" and insert in its place --3523045--.

Signed and Sealed this

Second Day of July, 1991

Attest:

HARRY F. MANBECK, JR.

*Attesting Officer*      *Commissioner of Patents and Trademarks*